United States Patent

Sae Il

Patent Number: 5,749,487
Date of Patent: May 12, 1998

[54] DEVICE FOR PREVENTING GUSH OF FUEL OIL FROM THE FUEL TANK

[75] Inventor: Kim Sae Il, Ulsan, Rep. of Korea

[73] Assignee: Hyundai Motor Company, Seoul, Rep. of Korea

[21] Appl. No.: 706,717

[22] Filed: Sep. 6, 1996

[30] Foreign Application Priority Data

Sep. 6, 1995 [KR] Rep. of Korea ............. 95-24173

[51] Int. Cl.$^6$ ............................................. B65D 25/00
[52] U.S. Cl. ............................. 220/86.2; 220/86.3
[58] Field of Search ......................... 220/86.1, 86.2, 220/86.3

[56] References Cited

U.S. PATENT DOCUMENTS

| | | | |
|---|---|---|---|
| 1,813,554 | 7/1931 | Wickline | 220/86.3 |
| 2,313,266 | 3/1943 | Roberts | 220/86.3 |
| 2,602,465 | 7/1952 | Goehring | 220/86.1 X |
| 3,951,297 | 4/1976 | Martin | 220/86.3 |
| 4,630,748 | 12/1986 | Keller | 220/86.3 |
| 5,025,946 | 6/1991 | Butkovich et al. | 220/86.3 |
| 5,348,177 | 9/1994 | Sung | 220/86.2 |

FOREIGN PATENT DOCUMENTS 60-111718  7/1985  Japan.

*Primary Examiner*—Steven M. Pollard

[57] ABSTRACT

The present invention relates to a device for preventing gush of fuel oil from the filler neck during the oil supplying. The oil dispersing device according to the invention is mounted at the inner end of the filler neck located in the fuel tank. The fuel oil dispersing device 10 includes a conical hollow dispersing plate 11 having a through hole formed at the top portion thereof, and a cylindrical extension rod 12 having a thread 13 formed at one end, and an insert 14 mounted at the other end. The dispersing plate 11 is mounted on the thread portion of the extension rod by means of a pair of nuts at both sides of the through hole. An insert 14 is provided for securely mounting the other end of the extension rod and for securing it within the lower end portion of filler neck. The end portion of filler neck 20 has a stepped section, and the insert is formed a lot of passages therethrough. As the injected oil through the filler neck is uniformly directed to the fuel tank and disperses to all direction in the tank, no specific oil flow in the fuel tank is occurred, which prevents injected oil from flowing backward to the filler neck.

3 Claims, 1 Drawing Sheet

DEVICE FOR PREVENTING GUSH OF FUEL OIL FROM THE FUEL TANK

BACKGROUND OF THE INVENTION

1. Field of the Invention

The present invention relates to a device for preventing gush of fuel oil from the fuel tank of an automobile and, more particularly, to a fuel oil dispersing device mounted in the inner end of a filler neck in order to prevent oil spouting from the fuel tank during oil supplying.

2. Description of the Prior Art

Generally, when oil is supplied to a fuel tank having relatively short filler neck, such as the one used in cargo truck, sometimes fuel oil is spouted from the filler mouth of the tank due to the backward flow occurred from striking of the oil supplied in a high injection pressure against inner wall of the tank.

The oil spouted from the fuel tank, even if it became a little amount, contaminates periphery of the filler mouth. Further, the leakage of oil results in a environmental pollution.

A device for preventing spout of fuel oil from the fuel tank has been disclosed in Japanese Unexamined U.M. Publication SHO 60-111718, laid open on Jul. 29, 1985. There, an annular retainer having a circular sealing plate and a valve plate is mounted at the injection opening formed in a wall of the fuel tank. The valve plate, made of an elastic material, is hung at the top portion of the sealing plate by a hinge, so as to provide one-way passage from the filler mouth to the inside of the fuel tank. However, during the oil supplying through relatively short filler neck, injection from the refueling gun occurs an oil spout due to the striking of the injected oil against the valve plate.

Also, mounting the valve retainer to the periphery of the opening is a difficult work as well as the valve body made of plastics is apt to be deteriorated.

SUMMARY OF THE INVENTION

The object of the present invention is to provide a device for preventing gush of fuel oil from the filler neck during the oil supplying.

The another object of the present invention is to provide novel structure of a fuel oil dispersing device mounted on the inner end portion of a filler neck, which can effectively prevent supplied oil from gushing out to the filler mouth during the oil supplying.

In achieving the above object, the present invention resides in a device for preventing gush of fuel oil from the filler neck during the oil supplying with the refueling gun, the device comprising: a conical hollow dispersing plate for dispersing the injected oil from the filler neck, the conical dispersing plate has a through hole formed at the top portion thereof; a extension rod for supporting the dispersing plate adjacent to the lower end of the filler neck, the extension rod includes a thread formed at one end to couple with the dispersing plate via the through hole; and an insert for securely mounting the other end of the extension rod and for placing onto the lower end portion of filler neck, the end portion of filler neck has a stepped section to secure the insert, the insert having an axial pipe for coupling with the other end of the extension rod, and a plurality of ribs radially formed around the axial pipe to support the insert, thereby forming a lot of passages within the insert.

In a preferred embodiments of this invention, the dispersing plate is displaced from the lower end of the filler neck at a predetermined distance. Further, the dispersing plate is mounted on the thread portion of the extension rod by means of a pair of nuts at both sides of the through hole.

Advantageously, because the injected oil through the filler neck is uniformly directed to the fuel tank and disperses to all direction in the tank, no specific oil flow in the fuel tank is occurred, which prevents injected oil from flowing backward to the filler neck.

BRIEF DESCRIPTION OF THE DRAWINGS

The above object and features of the present invention will become more apparent by describing in detail the preferred embodiment of the present invention with reference to the attached drawings in which.

DETAILED DESCRIPTION OF THE PREFERRED EMBODIMENT

Figure 1:
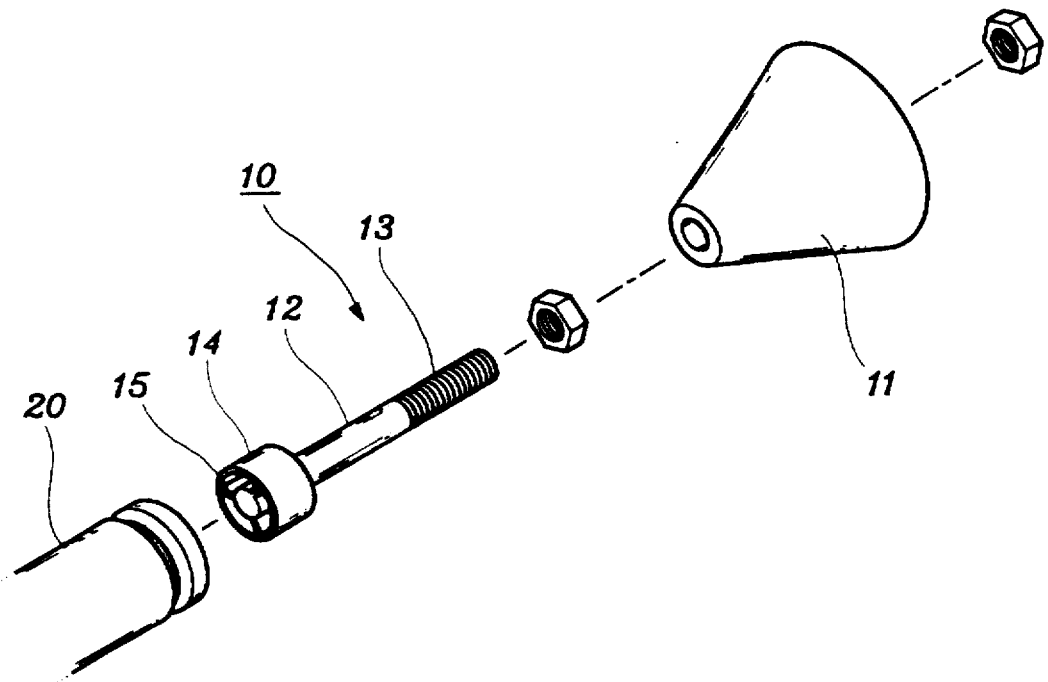
FIG. 1 is an exploded perspective view of the fuel oil dispersing device in accordance with the present invention.

Referring to FIG. 1, a fuel oil dispersing device for preventing gush of fuel oil from the filler neck during oil supplying in accordance with the present invention is disclosed.

Shown by an exploded components, the fuel oil dispersing device 10 includes a conical hollow dispersing plate 11 having a through hole formed at the top portion of the dispersing plate 11, and a cylindrical extension rod 12 having a thread 13 formed at one end of the rod 12 and a insert 14 mounted at the other end of the rod 12.

The thread portion 13 of the extension rod 12 is inserted by the through hole of the dispersing plate 11 and joined together by a pair of nuts at both sides of the through hole.

Also, the insert 14 has an axial pipe to be inserted and securely mounted to the other end portion of the extension rod 12, and a plurality of ribs 15 radially formed around the axial pipe to support the insert 14. Therefore, the insert 14 has a lot of passages formed therethrough.

The insert 14 mounted to the extension rod 12 is inserted into the lower end portion of cylindrical filler neck 20 which is mounted to penetrate one side or top wall of a fuel tank 30.

Figure 2:
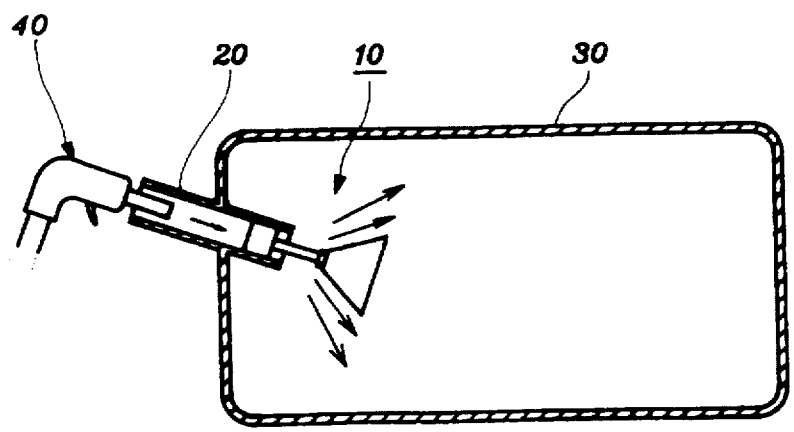
FIG. 2 is a sectional view of a fuel tank equipped with the fuel oil dispersing device of the present invention.

The filler neck 20 has relatively short length and is formed straightly so that the insert 14 mounted to the extension rod 12 be inserted from the outside of the filler neck 20. The lower end portion of filler neck 20 has a stepped section to secure the insert 14 within the filler neck 20, as shown in FIG. 2.

After securing the insert 14 to the lower end portion of filler neck 20, the conical dispersing plate 11 is mounted on the thread portion 13 of the extension rod 13. Thus, the insert 14 secured onto the inner surface of the filler neck 20 supports the extension rod 12 as well as the dispersing plate 11.

As apparent, the positioning of the dispersing plate 11 on the thread portion 13 can be determined by placing a pair of the nuts thereon as required.

Also, the upper end portion of the filler neck 20 forms a filler mouth on which a fuel tank cap (not shown) is secured, and when necessary, a refueling gun of gas station is inserted.

With this arrangement, when the oil is supplied from a refueling gun 40, having injection force, inserted into the filler neck 20, the oil passes through the passages formed in the insert 14 located at the lower end portion of the filler neck 20, and injected into the fuel tank 30.

The injected oil is then strikes onto the surface of the conical dispersing plate 11 and disperses along the slant surface of the plate 11.

Also, the oil is uniformly directed to the fuel tank 20 by the passages of the insert 14 and the extension rod 12. Further, the oil disperses to all direction in the fuel tank 20.

As will be apparent from the foregoing description, according to the conical dispersing plate 11 provided near the low end of the filler neck 20 by securing the insert 14 with the extension rod 12, when the dispersing plate 11 is mounted to the filler neck 20 of the fuel tank, because the injected oil through the filler neck is uniformly directed to the fuel tank and disperses to all direction in the tank, no specific oil flow in the fuel tank is occurred, which prevents injected oil from flowing backward to the filler neck. With this, the present invention can prevent gush of oil from the filler neck during the oil supplying, thereby preventing contamination of vehicle body and environmental pollution.

What is claimed is:

1. A device for preventing a gush of fuel oil from the filler neck during the oil supplying with the refueling gun, the device comprising:

a conical hollow dispersing plate for dispersing the injected oil from the filler neck, the conical dispersing plate having a through hole formed at the top portion thereof;

a cylindrical extension rod for supporting the dispersing plate adjacent to the lower end of the filler neck, the extension rod including a thread formed at one end to couple with the dispersing plate via the through hole; and an insert for securely mounting the other end of the extension rod and for placing onto the lower end portion of filler neck, the end portion of filler neck having a stepped section to secure the insert within the filler neck, the insert having an axial pipe for coupling with the other end of the extension rod, and a plurality of ribs radially formed around the axial pipe to support the insert, thereby forming a plurality of passages within the insert.

2. The device of claim 1, wherein the dispersing plate is displaced from the lower end of the filler neck at a predetermined distance.

3. The device of claim 1, wherein the dispersing plate is mounted on the thread portion of the extension rod by means of a pair of nuts at both sides of the through hole.

* * * * *